INVENTORS
GEORGE R. HOLDEN
JOSEPH R. SMITH, JR.

ATTORNEYS

INVENTORS
GEORGE R. HOLDEN
JOSEPH R. SMITH, JR.
ATTORNEYS

United States Patent Office 3,420,225
Patented Jan. 7, 1969

3,420,225
BALANCED BELLOWS SPIROMETER
George R. Holden, Palo Alto, and Joseph R. Smith, Jr., Milpitas, Calif., assignors to the United States of America as represented by the Administrator of the National Aeronautics and Space Administration
Filed Aug. 21, 1964, Ser. No. 391,343
U.S. Cl. 128—2.08                8 Claims
Int. Cl. A61b 5/08

The invention described herein may be manufactured and used by or for the Government of the United States of America for governmental purposes without the payment of any royalties thereon or therefor.

This invention relates to bellows type spirometers and more particularly to a bellows type spirometer which can operate properly even under the influence of acceleration forces in any direction.

One of the important present uses of spirometers is in connection with space travel, and also high altitude and high speed travel in the earth's atmosphere. Inherent in such uses is the problem of the acceleration forces experienced in take off, reentry, turns, and other maneuvers. Spirometers necessarily include an expandable and contractable chamber, and the forces of acceleration tend to expand or contract the chamber so that the action of the spirometer does not correctly reflect the respiratory action of the person being tested.

Accordingly, an object of this invention is to provide an improved spirometer which will operate properly even under the influence of acceleration forces in any direction.

Another object of this invention is to provide an acceleration-corrected spirometer which is compact in size.

A further object of this invention is to provide an improved means for measuring the action of the spirometer.

By way of brief description, a balanced bellows spirometer according to the invention comprises a center wall with a bellows mounted on each side of the wall. The bellows are pivotally connnected to opposite edges of the center wall and a passage through the center wall interconnects the two bellows chambers into one composite chamber. An inlet is provided into one bellows and an outlet is provided from the other bellows. The two bellows are mechanically interconnected so that the tendency of either bellows to move toward or away from the center wall under the influence of acceleration forces is resisted by an equal and opposite tendency of the other bellows to move under the influence of said acceleration forces. As a result, the bellows are not moved by acceleration forces and yet are free to expand and contract under the forces of air pressure.

The various objects and features of advantage will become more apparent from the following detailed description wherein reference is made to the accompanying drawings in which.

Figure 1:
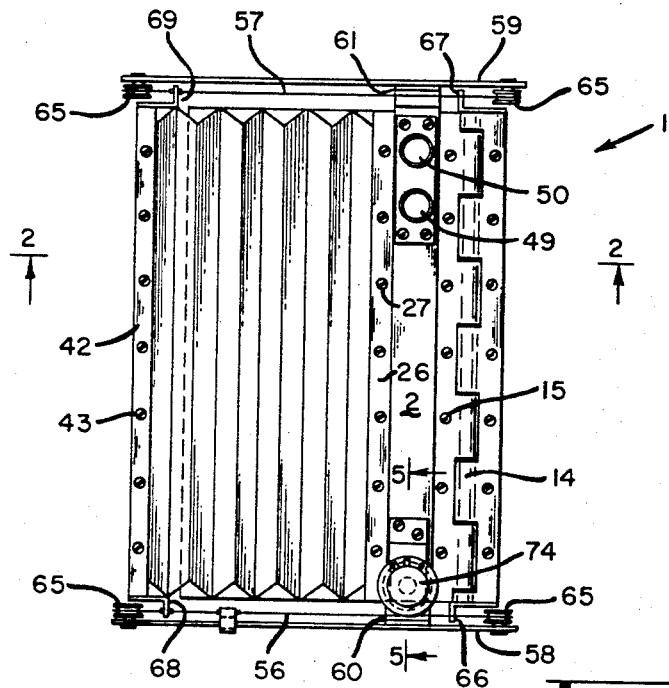
FIGURE 1 is a top view of a balanced bellows spirometer according to the invention with the bellows in fully expanded position.

Referring in more detail to the drawings, the invention comprises a spirometer 1 having a metal center wall 2 and a pair of chamber-forming bellows structures 3 and 4. The bellows structure 3 comprises a bellows 5 secured airtight to the center wall 2 by a bottom metal strip 6 and screws 7. The sides of the bellows 5 are secured to wall 2 by metal strips 8 and 9, and screws 10 and 11, respectively. The top of the bellows 5 is secured to the wall 2 by one side of a hinge strip 14 and screws 15. The outer end wall of the chamber formed by bellows 5 is formed by a thin metal plate 18 having an inturned peripheral rim to which bellows 5 is attached. The upper edge of bellows 5 is connected to plate 18 by the other side of hinge strip 14 and screws 19. The sides of bellows 5 are connected to plate 18 by metal strips such as the one shown at 20 and screws 21. The bottom of bellows 5 is attached to plate 18 by a metal strip 22 and screws 23.

In similar manner the bellows construction 4 comprises a bellows 25 secured airtight to the center wall 2 by a top metal strip 26 and screws 27. The sides of the bellows 25 are secured to the wall 2 by metal strips 28 and 29 and screws 30 and 31, respectively. The bottom of the bellows 25 is secured to wall 2 by one side of a hinge strip 34 and screws 35. The outer end wall of the chamber formed by bellows 25 is formed by a thin metal plate 38 having an inturned peripheral rim to which bellows 25 is attached. The lower edge of bellows 25 is connected to plate 38 by the other isde of hinge strip 34 and screws 39. The sides of bellows 25 are connected to plate 38 by metal strips such as the one shown at 40 and screws 41. The top of bellows 25 is attached to plate 38 by a metal strip 42 and screws 43.

Figure 4:
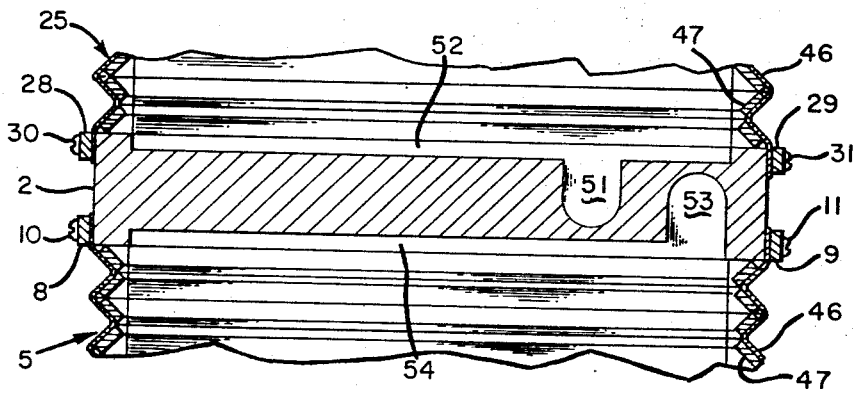
FIGURE 4 is an enlarged cross sectional view on the line 4—4 of FIG. 2.

The bellows 5 and 25 are identical in size, shape and construction. As shown in the enlarged view of FIG. 4 each of the bellows comprises a thin corrugated cloth wall 46 reinforced by strips 47 of thicker cloth material bonded completely around the inside periphery of wall 46. The strips 47 are not sealed to each other so they do not form any part of the airtight envelope, their sole purpose being to reinforce the wall 46.

The structure thus far described forms two expandable and contractable chambers. One chamber is formed by center wall 2, bellows 5 and end wall 18, and the other chamber is formed by center wall 2, bellows 25 and end wall 38. The center wall 2 is provided at its lower end with a passage 48 which interconnects the two chambers to form one composite chamber. If desired, the wall 2 can be made hollow as shown in order to be lighter in weight. The upper end of the center wall is provided with conventional inlet and outlet tubes 49 and 50. The inlet tube 49 opens into an inlet bore 51 and then to an inlet slot 52 for improved distribution of the incoming air pressure. Similarly, the outlet tube 50 opens into an outlet bore 53 and then to an outlet slot 54. Obviously, tubes 49 and 50 can be used interchangeably as the inlet and outlet. As will be undertsood by those skilled in the art, the conventional apparatus employed with the spirometer includes one-way valves in the lines connected to tubes 49 and 50. Thus, when a person undergoing test breaths into the apparatus, the exhaled air will be delivered into the spirometer, and no air will be allowed to leave the spirometer. For example, when air is delivered into tube 49 it will pass through bore 51 and slot 52 into the bellows 25, through passage 48, and into the bellows 5 causing both of the bellows to expand. When air is withdrawn through tube 50 it will cause air to pass from bellows 25 through pasage 48 and out bore 53, causing both of the bellows to contract.

Figure 2:
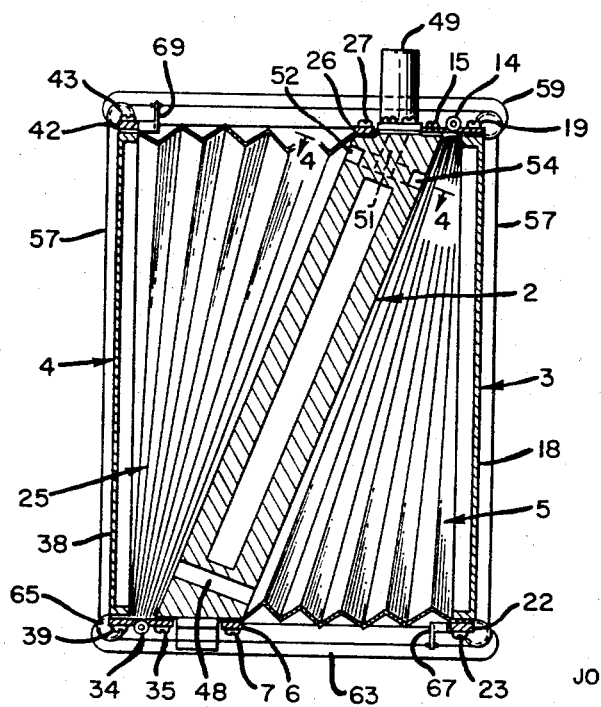
FIGURE 2 is a cross sectional view on the line 2—2 of FIG. 1.

Conventional spirometers normally have only one chamber, such as would be formed by either bellows structure 3 or 4 alone. Such a single bellows is subject to distortion caused by acceleration forces. For example, consider a spirometer such as would be formed by a single belows structure 3, with passage 48 closed and having both an inlet and an outlet to bellows structure 3. An acceleration of the main structure toward the right in FIG. 2 would cause the bellows structure 3 to contract because the end wall 18 would tend to remain stationary. Similarly, an acceleration toward the left in FIG. 2 would cause the bellows structure 3 to expand.

The noted deficiency of a single bellows construction is eliminated by the two bellows construction of the present invention. The solution is accomplished by an arrangement whereby the tendency of either one of the two bellows constructions to move under the influence of an acceleration force will be exactly counteracted by an equal and opposite tendency of the other bellows construction to move under the influence of the acceleration force. More specifically, the bellows constructions 3 and 4 are mechanically interconnected so that they prevent each other from moving under the influence of acceleration forces and yet do not hinder movement caused by breathing into and out of the spirometer.

According to the preferred embodiment, the two bellows constructions 3 and 4 are interconnected by two string loops 56 and 57. The term string is used in the specification and claims in a broad sense to include any material except a resilient material such as rubber. In order to support the string and cause it to follow a continuous travel path, a pair of mounting arms 58 and 59 are secured to the upper end of the center wall 2. For example, the arms 58 and 59 can be held in position by right angle brackets 60 and 61, respectively, welded or brazed both to the center wall and to the mounting arms. Similarly, a pair of mounting arms 62 and 63 are secured to the lower end of the center wall.

Ajacent each end of each mounting arm on the inside thereof is mounted a pulley wheel 65. The lower free edge of the bellows construction 5 has brazed or welded to the opposite ends thereof attachment brackets 66 and 67 which are apertured to receive the string loops. Similarly, the upper free edge of the bellows construction 25 has attached to the opposite ends thereof string attachment brackets 68 and 69. String loop 56 is threaded around four of the pulley wheels 65 and through the attachment brackets 66 and 68. The attachment brackets are then crimped tight around the loop 56 so as to travel therewith. Loop 57 is threaded around the other four pulley wheels 65 and through the attachment brackets 67 and 69 which are then crimped on the loop.

Figure 3:
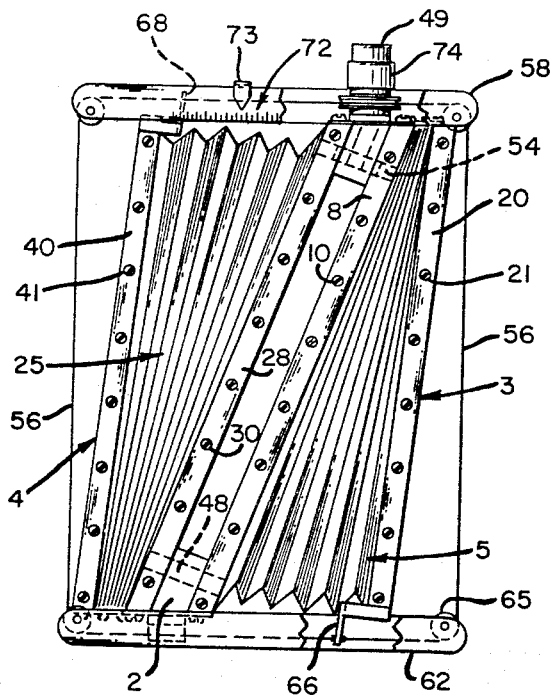
FIGURE 3 is a side view of FIG. 1 with parts broken away for clarity and with the bellows partly contracted.

Thus, it will be apparent that the two bellows constructions 3 and 4 are locked together so that they are forced to expand in unison and contract in unison. More specifically, as viewed in FIG. 3, if air is forced into the spirometer, bellows 5 and 25 will expand and force loops 56 and 57 to move counterclockwise. If air is withdrawn from the spirometer, the bellows will contract and force loops 56 and 57 to move clockwise. Neither of the bellows structures 3 and 4 hinders the expansion or contraction of the other when such expansion or contraction is caused by air pressure. However if the spirometer should be accelerated, the force on one bellows is opposed by an opposite and equal force on the other bellows and no bellows movement results from the accelerative force. For example, if the spirometer is accelerated to the right in FIG. 2, end plate 18 will tend to remain stationary and will tend to move loops 56 and 57 clockwise. At the same time end plate 38 will also tend to remain stationary and will tend to move loops 56 and 57 counterclockwise. As a result, the loops 56 and 57 will be placed in tension. Since the loops are of non-yielding material neither of the bellows constructions 3 and 4 will move relative to the center wall 2, and the spirometer will be unaffected by acceleration forces. Obviously, a similar corrective situation prevails if the spirometer is accelerated to the left or any other direction which would tend to cause motion about hinges 14 and 34. Acceleration in any direction which does not tend to cause motion about hinges 14 and 34 does not cause any problem.

Figure 5:
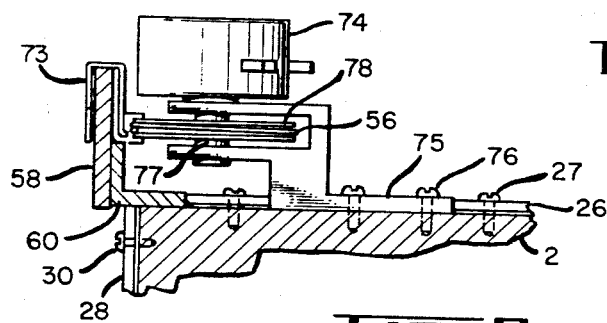
FIGURE 5 is an enlarged view taken on the line 5—5 of FIG. 1.

In order to measure the displacement of the bellows, a visual and an electrical means are provided. The visual means comprises a scale 72 drawn on the mounting arm 58, and a pointer 73 is crimped on the loop 56. The electrical means comprises a conventional three-terminal potentiometer 74 as shown best in FIG. 5. The potentiometer is supported on a bracket 75 attached to the top of the center wall 2 by screws 76. The potentiometer has a drive shaft 77 and is mounted so that the shaft is free to turn. A pulley wheel 78 is mounted on shaft 77, and loop 56 is wound around wheel 78 to drive the potentiometer in response to movement of the loop.

It should be noted that the center wall 2 is positioned so that it is oblique with respect to the rectangle formed by the string loops 56 and 57. It can also be stated that the wall 2 is substantially at the diagonal of the square produced when the bellows are open to maximum volume. In this way the structure is made obviously much more compact than if the wall 2 were normal to the mounting arms 58, 59, 62 and 63.

Although specific details of the invention have been shown and described herein it is to be understood that modifications may be made therein without departing from the spirit and scope of the invention as set forth in the appended claims.

Having thus described the invention what is claimed as new and desired to be secured by Letters Patent is:

1. A spirometer comprising a center wall, a bellows mounted on each side of said wall to form an expandable and contractable chamber on each side of said wall, inlet and outlet means in communicatinn with said chambers, one side of one of said bellows being pivotally connected to one edge of said center wall, one side of the other of said bellows being pivotally connected to the opposite edge of said center wall, said center wall having a passage interconnecting said chambers, a string loop, and means forming a continuous travel path for said loop around both of said bellows said string being connected to both of said bellows on the sides of the bellows opposite the pivotally connected sides of the bellows.

2. A spirometer as claimed in claim 1 in which said continuous travel path is rectangular, and said center wall is oblique with respect to said rectangle.

3. A spirometer as claimed in claim 1 further comprising a potentiometer having a drive shaft, and in which said string is connected to said potentiometer drive shaft to cause pivotal movement of said shaft when said bellows expand and contract.

4. A spirometer as claimed in claim 1 further comprising a pointer attached to said string, and a scale mounted on said center wall and traversed by said pointer upon movement of said string.

5. A spirometer as claimed in claim 4 in which said continuous travel path is rectangular, and said center wall is oblique with respect to said rectangle, and further comprising a potentiometer having a drive shaft, and said string is connected to said potentiometer drive shaft to cause pivotal movement of said shaft when said bellows expand and contract.

6. A spirometer comprising a center wall, a bellows mounted on each side of said wall to form an expandable and contractable chamber on each side of said wall, an inlet port and an outlet port communicating with said chambers, respectively, one side of one of said bellows being pivotally connected to one edge of said center wall, one side of the other of said bellows being pivotally connected to the opposite edge of said center wall, said center wall having a passage interconnecting said chambers, an elongated mounting arm attached to said center wall adjacent each of said opposite edges, a string guide adjacent each end of said mounting arms, and a string looped around said guides, said string being connected to both of said bellows on the sides of the bellows opposite the pivotally connected sides of the bellows.

7. A spirometer as claimed in claim 6 wherein said inlet port and an outlet port are provided in an edge of said center wall, said inlet port opens into a groove on the face of said wall in one of said chambers, and said outlet port opens into a groove on the face of said wall in the other of said chambers.

8. A spirometer as claimed in claim 6 further comprising a potentiometer having a drive shaft, said potentiometer being mounted on said center wall adjacent said string, and said string being connected to said drive shaft to cause pivotal movement of said shaft when said bellows expand and contract.

References Cited

UNITED STATES PATENTS

| | | | |
|---|---|---|---|
| 2,228,983 | 1/1941 | Bloomheart | 128—2.07 |
| 2,999,495 | 9/1961 | Shipley | 128—2.08 |
| 3,086,515 | 4/1963 | Jones | 128—2.08 |
| 966,050 | 8/1910 | Ramage | 128—2.08 |
| 3,129,705 | 4/1964 | Nemec et al. | 128—2.07 |

OTHER REFERENCES

German printed application 1,122,216 (1962).

DALTON L. TRULUCK, *Primary Examiner.*

KYLE L. HOWELL, *Assistant Examiner.*

U.S. Cl. X.R.

73—262; 103—148